US010570967B2

(12) United States Patent
Cupit

(10) Patent No.: US 10,570,967 B2
(45) Date of Patent: Feb. 25, 2020

(54) CLUTCH BASKET ASSEMBLY

(71) Applicant: Dual Clutch IP Limited, Auckland (NZ)

(72) Inventor: Glenn Cupit, Auckland (NZ)

(73) Assignee: DUAL CLUTCH IP LIMITED, Auckland (NZ)

(*) Notice: Subject to any disclaimer, the term of this patent is extended or adjusted under 35 U.S.C. 154(b) by 455 days.

(21) Appl. No.: 15/258,008

(22) Filed: Sep. 7, 2016

(65) Prior Publication Data
US 2018/0066715 A1 Mar. 8, 2018

(51) Int. Cl.
*F16D 13/62* (2006.01)
*F16D 13/68* (2006.01)

(52) U.S. Cl.
CPC .................. *F16D 13/683* (2013.01)

(58) Field of Classification Search
CPC ........ F16D 13/62; F16D 13/68; F16D 13/683; F16D 13/52; F16D 2300/12; F16D 13/58; F16D 2055/0008; F16D 2250/00–0092; F16D 2250/0023
See application file for complete search history.

(56) References Cited

U.S. PATENT DOCUMENTS

| | | | | |
|---|---|---|---|---|
| 9,068,605 B2* | 6/2015 | Ratner | ................... | F16D 13/648 |
| 2007/0193848 A1* | 8/2007 | Uhler | ................... | F16D 13/683 |
| | | | | 192/112 |
| 2011/0297503 A1* | 12/2011 | Szuba | ................... | F16D 13/683 |
| | | | | 192/108 |

FOREIGN PATENT DOCUMENTS

| | | | | |
|---|---|---|---|---|
| DE | 102007029001 A1 * | 12/2008 | .......... | F16D 13/683 |
| DE | 102007029005 A1 * | 12/2008 | .......... | F16D 13/683 |
| EP | 3061984 A1 * | 8/2016 | .............. | F16D 1/00 |

* cited by examiner

Primary Examiner — Jacob S. Scott
Assistant Examiner — Lillian T Nguyen
(74) Attorney, Agent, or Firm — Timothy M. McCarthy

(57) ABSTRACT

Some OEM clutch suppliers provide a clutch system that is welded closed and accordingly these systems are difficult to maintain, service and/or upgrade, for example after drive or driven (friction) disks have worn out. Typically, these systems are intended to be entirely replaced. Alternatively, in order to access the clutch internals the welded assembly needs to be cut open and only then can the disks can be replaced. After re-assembly, re-welding is required in which alignment of components is difficult to achieve and costly. The serviceable clutch housing system provides a solution to overcome the disadvantages of a non-serviceable OEM clutch product by providing a means to retrofit to the clutch allowing assembly and disassembly of the clutch, while maintaining many of the original OEM parts. This results in reduction in the maintenance cost and time required for assembly after servicing.

14 Claims, 6 Drawing Sheets

CLUTCH BASKET ASSEMBLY

FIELD OF THE INVENTION

The present invention relates to a method and apparatus for providing a serviceable clutch housing. More particularly, the invention relates to methods and apparatus for making a non-serviceable clutch housing serviceable.

BACKGROUND TO THE INVENTION

Clutches are used as an interruptible coupling between two rotating devices. In a road vehicle a clutch is a device that disconnects the engine drive, to free the transmission from torque, while engaging and disengaging gears. As a result the clutch makes the drive smooth by avoiding shocks while changing the gears.

While there are many different types of clutches, a friction system is most economical, effective and efficient. Typically friction clutches have either a single friction plate, or multiple friction plates and may be dry or wet. Multi plate clutches are particularly suited to applications requiring high torque transmission capability, and for this reason multi-plate clutches are most commonly used in the automobile industry, and especially high performance automobiles.

In order to increase the torque transmitting capacity of a clutch, a number of friction plates are used in a multi-plate clutch system. In general, the clutch consists of a stack of drive plates, and driven plates that are arranged concentrically. Drive disks and driven disks are assembled in an alternating sequence. The drive disks are typically made of steel and these disks have external teeth which mesh with corresponding internal slots of the basket.

The driven disks are typically made of steel and coated with a friction material. The driven disks include internal teeth which mesh with corresponding outer slots of the hub.

This stack of drive and driven disks, when compressed axially, results in the clutch assembly transmitting torque from the driven disks to the drive disks effectively. The drive and driven disks stack without application of compressive force, can rotate freely relative to each other, interrupting the torque transmission.

The drive and driven disks experience significant friction while engaging and disengaging during operation of the clutch. While up shifting and downshifting, the engine's output undergoes major acceleration and deceleration, particularly in high-performance applications. This not only results in noise and vibration, but also cause high wear rate of these disks which eventually result in the loss of torque transmission. Accordingly, over a period of time it is common for the disks used in the clutch to wear out, and need to be replaced for effective torque transmission.

However, there are some disadvantages to many clutches provided by OEM's where the clutch is manufactured with welded clutch basket construction. While this type of construction can improve strength and/or reduce cost, it also makes it very difficult to replace the damaged and/or worn out friction disks. In many instances the clutch is not considered serviceable, and the entire clutch needs to be replaced.

Accordingly, it would be useful to provide a serviceable clutch housing system which allows the replacement of friction plates and/or other internal clutch components, after failure found in welded OEM clutch systems. Further, it is preferred that at least some of the OEM parts are re-used.

It is therefore an object of the present invention to provide a method and/or apparatus for making a non-serviceable clutch with welded basket, serviceable, or to at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

According to a first aspect the invention broadly comprises a modified clutch basket assembly comprising:
  a generally cylindrical basket housing including a plurality of alternating basket slots and basket teeth on an outer surface extending parallel with an axis of said basket, said basket further defining an upper rim extending around a perimeter of said cylindrical basket housing at one end,
  a backing ring including a first set of backing ring teeth and backing ring slots configured to correspond and engage with said basket slots and basket teeth, to allow said backing ring to slide over said basket in an axial direction, and prevent relative rotation between said backing ring and said basket,
  a clutch basket lid including a plurality of basket lid teeth on an outer circumference,
  wherein said backing ring includes a second set of backing ring teeth and backing ring slots configured to correspond and engage with said basket lid teeth, to prevent relative rotation between said backing ring and said basket lid, and
  a retainer to retain said backing ring in a position that rigidly couples said clutch basket to said basket lid in a removable manner.

According to a further aspect said backing ring engages with said clutch basket rim to prevent said backing ring from sliding off said clutch basket.

According to a further aspect said retainer is a circlip that engages with an inner circumferential groove associated with said second set of backing ring teeth of said backing ring.

According to a further aspect said clutch basket housing is a modified OEM part from a previously welded clutch.

According to a further aspect said OEM clutch basket housing is modified by cutting said joint a housing to separate it from an OEM basket lid along a welded joint, such that a circumferential rim portion is left on said basket housing.

According to a further aspect said clutch basket lid is not an OEM part.

According to a further aspect said backing ring is not an OEM part.

According to a further aspects the present invention broadly comprises a method of modifying a clutch basket assembly comprising:
  taking an OEM clutch assembly comprising a clutch basket housing and clutch basket lid welded together, said clutch basket housing being generally cylindrical and including a plurality of alternating basket slots and basket teeth on an outer surface extending parallel with an axis of said basket,
  joint cutting said housing to separate it from said OEM basket lid along or near a welded joint, providing a backing ring including a first set of backing ring teeth and backing ring slots configured to correspond and engage with said basket slots and basket teeth, to allow said backing ring to slide over said basket in an axial direction, and prevent relative rotation between said backing ring and said basket, providing a clutch basket lid including a plurality of basket lid teeth on an outer circumference, engaging said basket lid teeth with said backing ring that further comprises a second set of backing ring teeth and backing ring slots configured to correspond and engage with said basket lid teeth, to prevent relative rotation between said backing ring and said basket lid, and retaining said backing ring in a position that rigidly couples said clutch basket to said basket lid in a removable manner.

According to a further aspect said clutch basket assembly is serviced between the steps of cutting said housing and engaging said backing ring with said lid.

According to a further aspect said step of servicing includes replacement of at least one part within said clutch basket housing.

According to a further aspect said replaced part includes at least one driven disk or at least one drive disk.

According to a further aspect said step of cutting said housing leaves a circumferential rim portion on an upper end of said basket housing.

According to a further aspect when assembled, said backing ring engages with said rim to prevent said backing ring from slipping off said housing.

According to a further aspect said retainer is a circlip that engages with an inner circumferential groove associated with said second set of backing ring teeth of said backing ring.

According to a further aspect said clutch basket lid is not an OEM part.

According to a further aspect said backing ring is not an OEM part.

According to a further aspect the invention broadly comprises a kit of parts for modifying an OEM clutch basket assembly comprising a generally cylindrical basket housing including a plurality of alternating basket slots and basket teeth on an outer surface extending parallel with an axis of said basket comprising:

a clutch basket lid including a plurality of basket lid teeth on an outer circumference, a backing ring including a first set of backing ring teeth and backing ring slots configured to correspond and engage with said basket slots and basket teeth, to allow said backing ring to slide over said basket in an axial direction, and prevent relative rotation between said backing ring and said basket, and a second set of backing ring teeth and backing ring slots configured to correspond and engage with said basket lid teeth, to prevent relative rotation between said backing ring and said basket lid, and a retainer to retain said backing ring in a position that rigidly couples said clutch basket to said basket lid in a removable manner.

According to a further aspect said backing ring further includes an inner circumferential groove associated with said second set of backing ring teeth, and said retainer is a circlip.

According to a further aspect the invention broadly comprises a modified clutch basket assembly as herein described and with reference to any one or more of the drawings.

According to a further aspect the invention broadly comprises a method of modifying a clutch basket assembly as herein described and with reference to any one or more of the drawings.

The term "comprising" as used in this specification and claims means "consisting at least in part of". When interpreting each statement in this specification and claims that includes the term "comprising", features other than that or those prefaced by the term "comprising", may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Preferred embodiments of the invention will be described by way of example only and with reference to the drawings, in which.

The invention consists in the foregoing and also envisages constructions of which the following gives examples only.

DETAILED DESCRIPTION OF PREFERRED EMBODIMENTS

Figure 9:
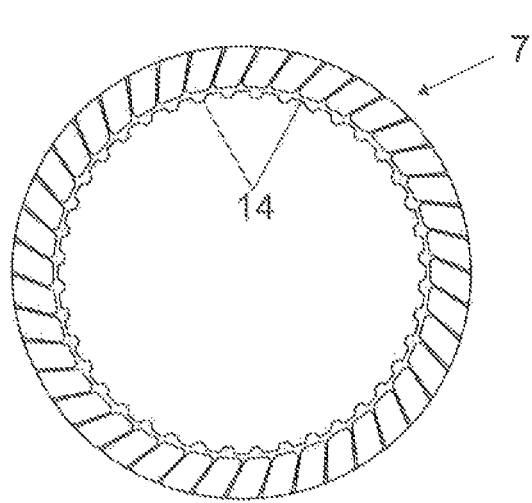
FIG. 9 is a top view of a typical driven disk.
Figure 10:
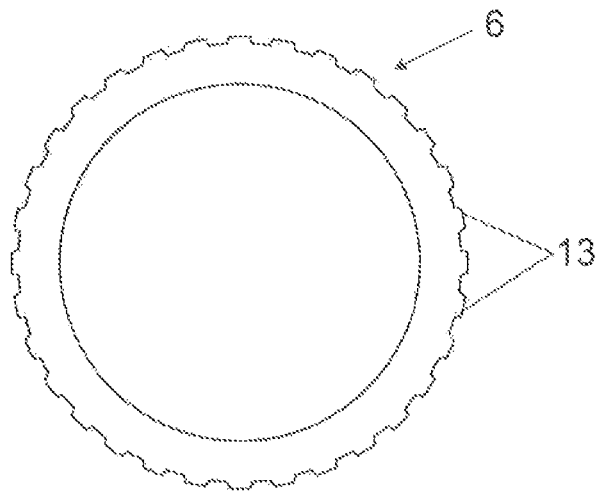
FIG. 10 is a top view of a typical drive disk.

The whole clutch assembly in indicated by 1 in FIG. 9. The clutch is connected to the flywheel by splined shaft 18, and the other end 19 is connected to the transmission. The illustrated clutch 1 in this example is a multi-plate dual clutch system of a type commonly found in high performance vehicles. In various figures, the internal contents have been simplified. However, it is anticipated that the present invention can find useful application in other single clutch and/or single plate configurations.

Figure 7:
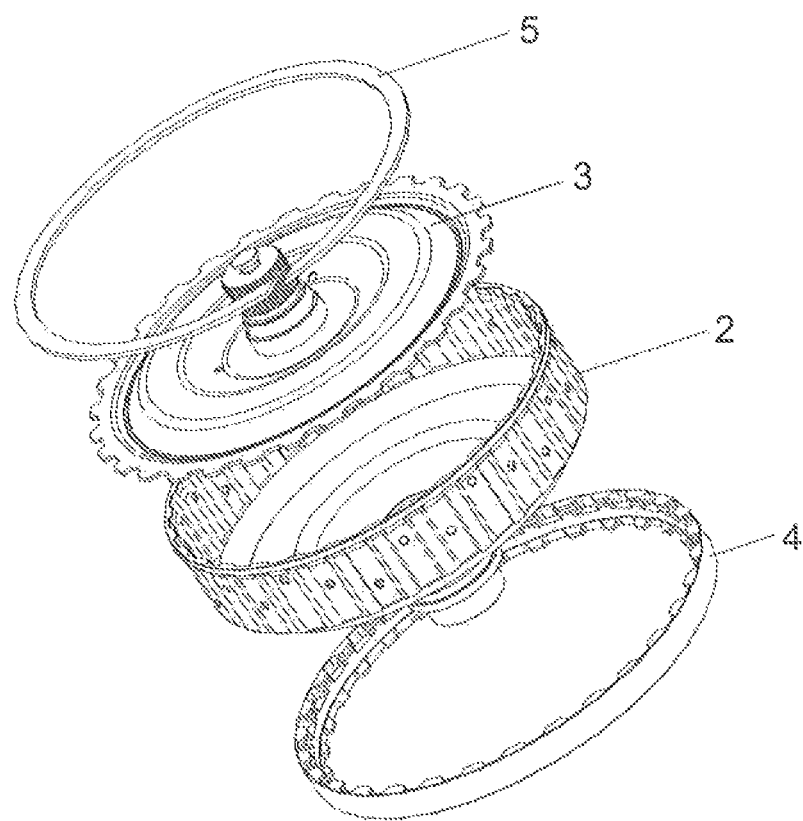
FIG. 7 shows a simplified exploded view of the serviceable clutch basket assembly.
Figure 12:
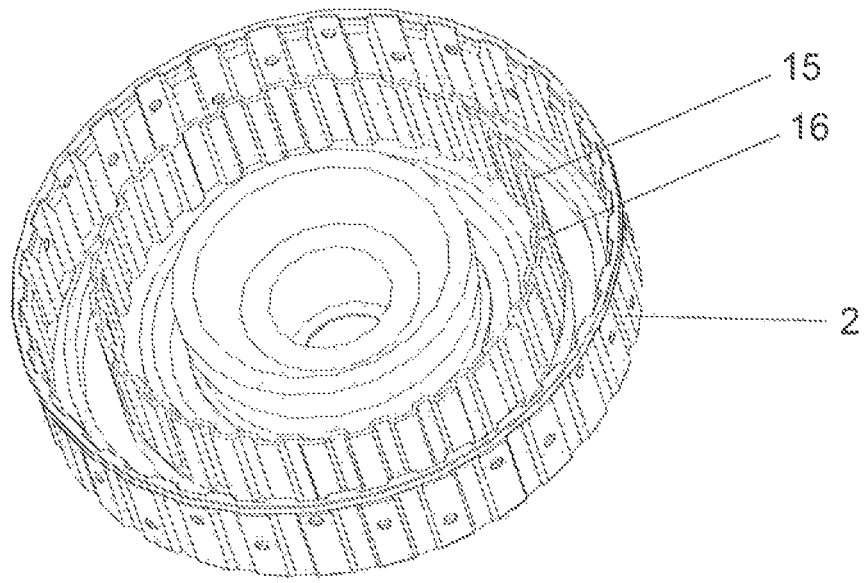
FIG. 12 is a perspective view of the clutch basket showing some additional internal detail.

As shown simplified in FIG. 7, the clutch comprises of a clutch basket housing 2 which is rotating about the axis of rotation of a drive shaft. A hub is connected inside of the clutch basket housing 2, (as best shown in FIG. 12), and rotates about the driven shaft. The clutch basket housing 2 contains a stack of a number of drive disks 6 (shown in FIG.

10), and a number of driven disks 7 (shown in FIG. 9) arranged in an alternating pattern, as is generally well known.

The drive disks are coupled with the clutch basket housing 2 by number of external teeth 13 on the drive disks 6 which engage with corresponding teeth 20 in slots 12 formed through the wall of clutch basket housing 2.

Similarly, the driven disks 7 are coupled with the hub 15 by a number of internal teeth 14 on the driven disks which engage corresponding external slots 16 on the hub 15.

The pack of alternating drive disks 6 and driven disks 7, are packed in between top basket cover 3, and the bottom of the clutch basket housing 2 in an alternating sequence.

The clutch engages by applying a compression force on the pack of drive disks 6 and driven disk 7, to transmit the torque from drive disks 6 to driven disks 7. Over time the drive disks 6 and driven disks 7 may wear out due to friction. The mis-shifting of gears or repeated harsh clutch engagement can result in a high wear rate of the friction lining on disks 7 and/or the friction surfaces of drive disks 6. The present invention provides a solution for the replacement of these worn out disks for welded OEM clutch system designs.

Figure 1:
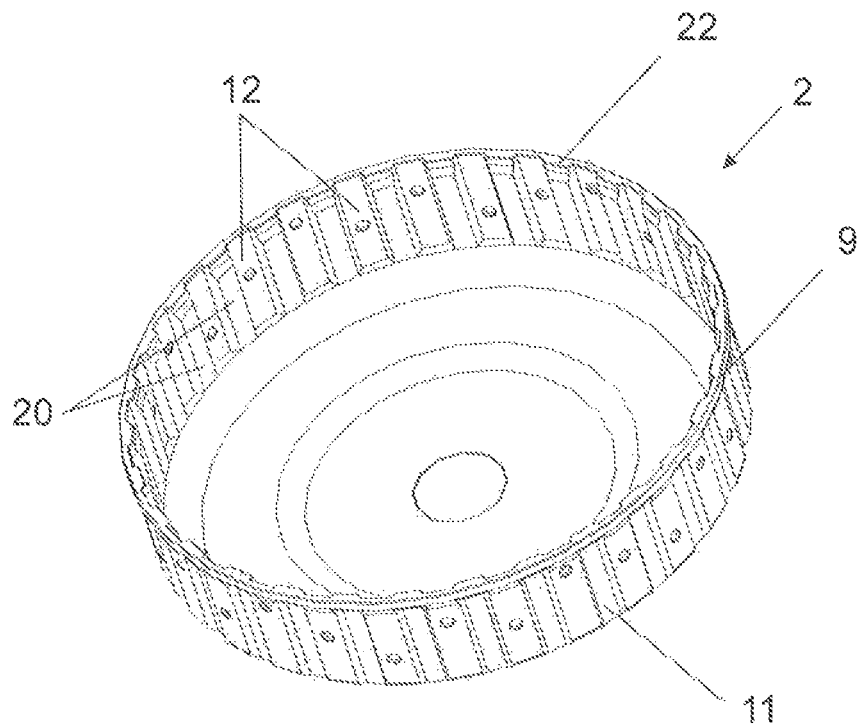
FIG. 1 shows a perspective view of a split clutch basket assembly.

With particular reference to FIG. 1, an OEM welded clutch basket 2 is shown after the OEM clutch basket cover (not shown) has been removed by cutting the assembly to form a top basket surface 22, and leaving an upper rim 9. This type of clutch basket is typically formed from pressed sheet material. The cutting process is preferably achieved by placing the assembly on a lathe and separating the basket lid from the basket housing 2, ensuring an accurate separation aligned with the axis of the clutch basket 2.

With the clutch assembly opened in this way, it will be appreciated that the internal components of the clutch can now be serviced and/or replaced as desired. After servicing is complete, the clutch must be re-assembled.

Figure 2:
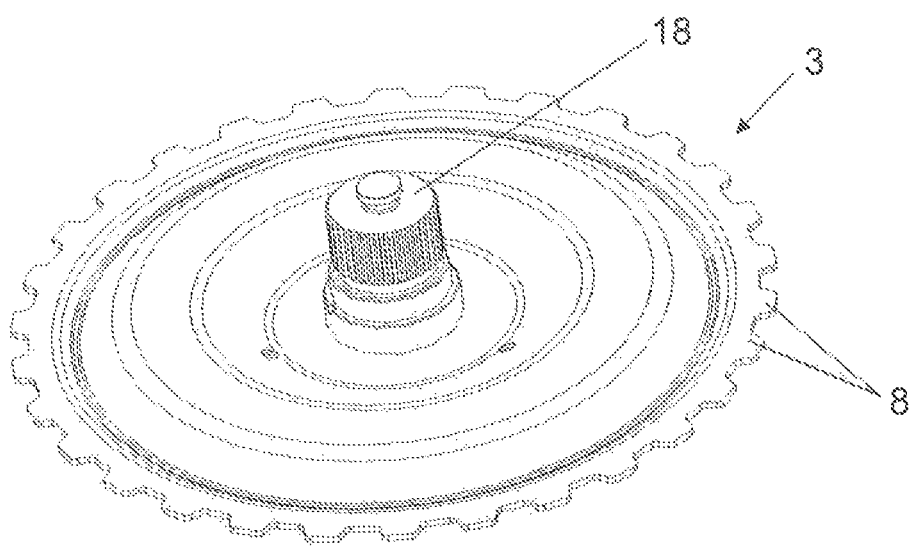
FIG. 2 shows a perspective view of a replacement lid for the split clutch basket assembly of FIG. 1.

To facilitate re-assembly, a new clutch basket top cover 3 is machined, as illustrated in FIG. 2. The top cover 3 includes a flywheel connecting splined shaft 18 equivalent to that from the original OEM housing for mating with the flywheel. Around the outer perimeter of the top cover 3 are a plurality of external teeth 8.

Figure 3:
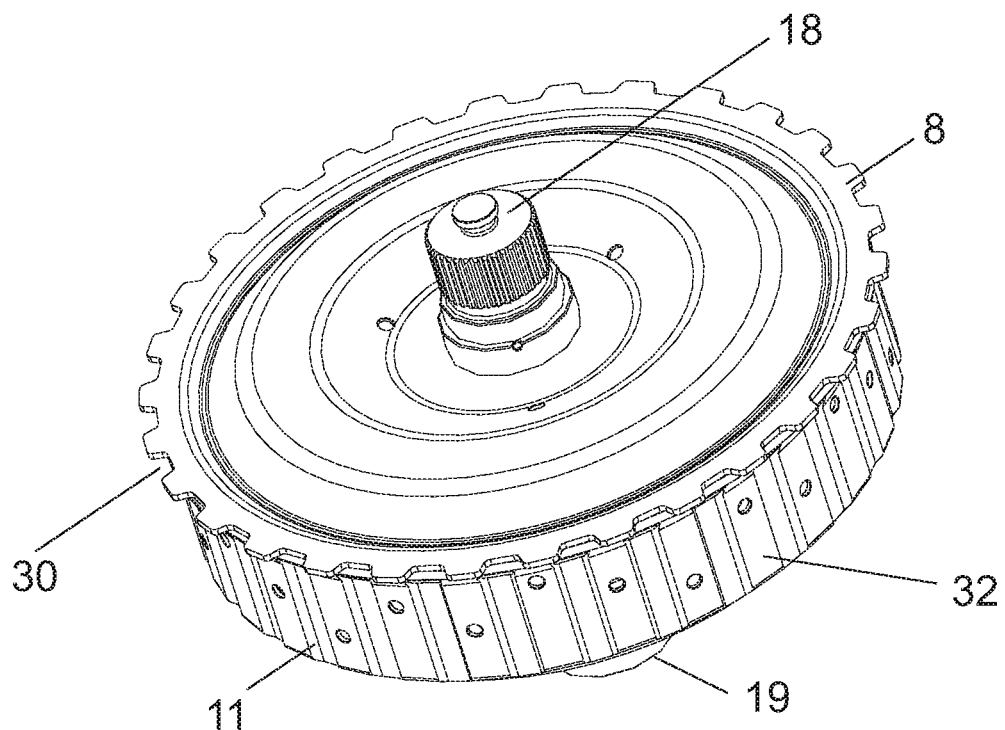
FIG. 3 shows a perspective view of the replacement lid of FIG. 2, located on the clutch basket housing of FIG. 1.

With particular reference to FIG. 3, the new top basket cover 3 is shown placed on top of the modified OEM clutch basket housing 2. The external teeth 8 protrude with a larger diameter than the clutch basket housing 2.

Figure 8:
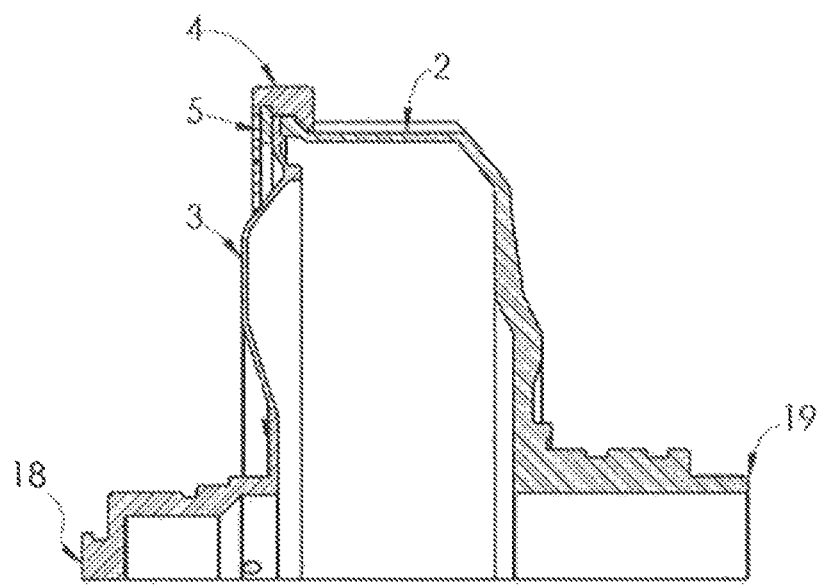
FIG. 8 shows cross sectional view of the split clutch basket assembly.

As shown in FIG. 8 the top basket cover 3 is assembled with clutch basket housing 2 with the help of backing ring 4. The backing ring (illustrated in FIG. 4) is angularly coupled with the clutch basket housing 2, by internal teeth 10 on backing ring 4, which engage with the external slots 11, on clutch basket housing 2. The internal slots 21 on backing 4 also engage with outer basket teeth 32, on clutch basket housing 2.

The backing ring is installed from the bottom of the basket housing 2 and the inner teeth 10 engage with outer slots 11 of the basket housing, to couple them together and allow transmission of torque. This will maintain the backing ring in position eliminating relative motion between backing ring and basket housing.

Figure 4:
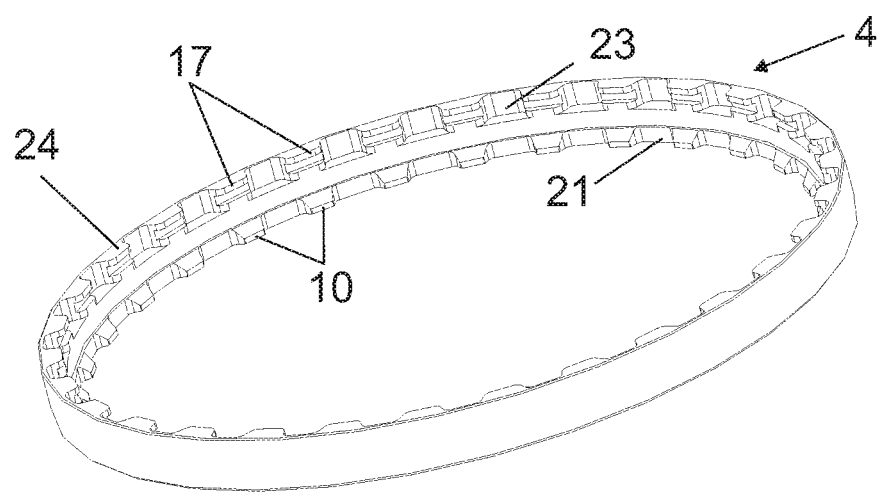
FIG. 4 shows a perspective view of a backing ring.

As shown in FIG. 4, the internal teeth 10 of backing ring 4 are machined with a tapered shape that corresponds to the underside of the rim 9 of the clutch basket housing 2. However, it's will be appreciated that the precise shape of teeth 10 may be dictated by the shape of the OEM clutch basket housing employed. When assembled, the teeth 10 and rim 9, engage to prevent the backing ring from coming off the clutch basket housing 2. The engagement of the internal teeth 10 and external slots 11 eliminates relative angular motion between the backing ring 4, and clutch basket housing 2, and also maintains the alignment between components.

Top basket cover 3 is coupled with the backing ring by external teeth 8 on it, and corresponding internal slots 23 on backing ring 4. The too basket cover 3 also has external slots 30, corresponding with internal teeth 24 on backing ring 4. This eliminates the relative angular motion between top basket cover 3 and backing ring 4, and also maintains the alignment.

Figure 5:
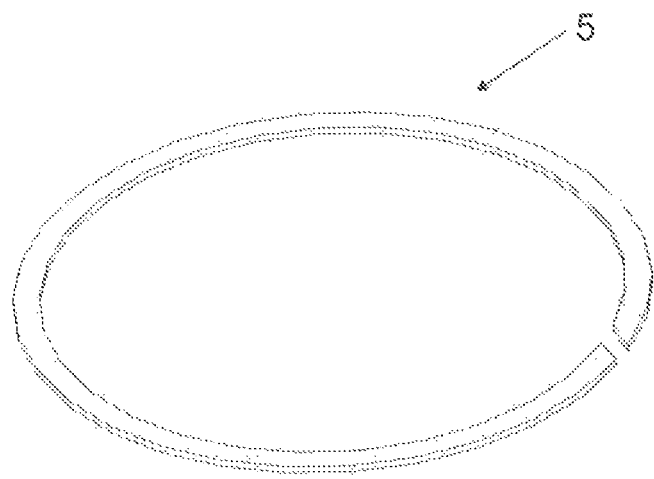
FIG. 5 shows a perspective view of a retaining circlip.
Figure 6:
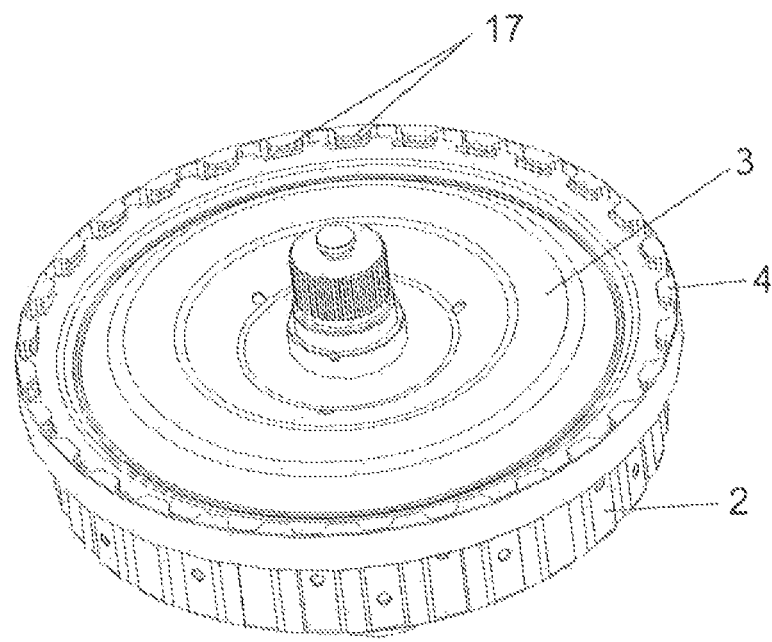
FIG. 6 shows a perspective view of the replacement lid of FIG. 2 held in position on the basket of FIG. 1, by a backing ring.

FIG. 6 shows the clutch basket housing 2 and top basket cover 3 engaged together by backing ring 4. The top basket cover 3 is maintained in position in the backing ring by retaining circlip 5 (shown in FIG. 5). The retaining circlip 5 sits inside the circlip groove 17 on the backing ring 4, and completes the assembly.

It will be appreciated that the clutch basket assembly 1 can be retro fitted to a previously welded clutch basket, by providing a new clutch basket lid 3, and corresponding backing ring 4 to couple them together in a removable manner.

It has been found that the present retrofit system is extremely strong and can cope with the very high torque requirements of high performance vehicles. At the same time, the present system utilises the OEM clutch basket housing 2 and requires only minimal modification in order to be adapted for use with the present system.

Figure 11:
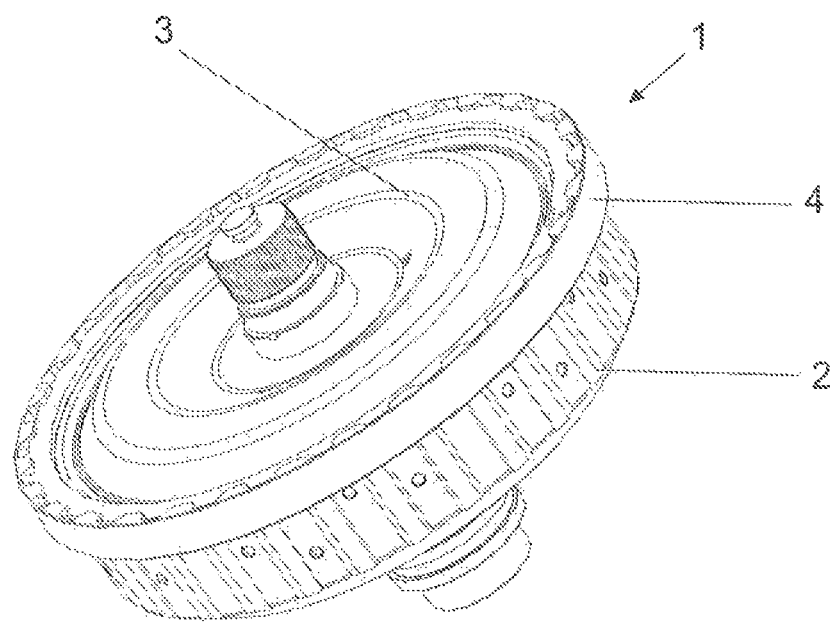
FIG. 11 is a perspective view of the clutch basket assembly.

The retaining circlip 5 can be removed and the top basket cover 3 can be taken out to replace the worn out drive disks 6 or driven disks 7. After replacement of the disks 6 and/or 7, the top basket cover 3 again can be fitted in the clutch basket housing 2 by engaging teeth 8 on top basket cover 3 with internal slots of backing ring 4. The retaining circlip 5 is used to maintain the top basket cover 3 in position, to complete the assembly as illustrated in FIG. 11. The present invention maintains the alignment of the assembly which is difficult when cutting and re-welding of the OEM clutch assembly.

It is anticipated that the components being the basket cover 3 and backing ring 4 may be manufactured from a number of suitable materials, however is preferred that the components are machined from a high tensile steel.

The serviceable clutch housing clip system helps to overcome the shortcomings of current design of clutch baskets from OEM suppliers. A clutch basket designed in a split system allows the possibility to change the drive and driven plates inside it with ease.

The OEM clutch basket previously welded is split in two parts, one is the basket housing and the other is top basket cover. A replacement top basket cover is designed in a way that it fits inside of a backing ring, and has outer teeth which engage with inner slots of the backing ring.

The present invention provides an advantage for the maintenance of the clutch after wear of the drive and driven plates, by allowing the top basket cover to be easily removed after taking out the retaining circlip in the backing ring, and the drive and driven disks can be then be replaced. Importantly, the present system maintains the original OEM clutch basket which is minimally modified to adapt it to the present system.

The time required for dissembling and assembling is reduced resulting in reduction in time required for maintenance.

The foregoing description of the invention includes preferred forms thereof. Modifications may be made thereto without departing from the scope of the invention as defined by the accompanying claims.

The invention that is claimed is:

1. A clutch basket assembly comprising:
a generally cylindrical basket housing including a plurality of alternating basket slots and basket teeth on an outer surface extending parallel with an axis of said basket housing, said basket housing further defining an upper rim extending around a perimeter of said cylindrical basket housing at one end,
a backing ring including a first set of internal backing ring teeth and a first set of internal backing ring slots configured to correspond and engage with said basket slots and basket teeth, to allow said backing ring to slide over said basket housing in an axial direction, and prevent relative rotation between said backing ring and said basket housing,
a clutch basket lid including a plurality of basket lid teeth on an outer circumference,
wherein said backing ring includes a second set of internal backing ring teeth and a second set of internal backing ring slots configured to correspond and engage with said basket lid teeth, to prevent relative rotation between said backing ring and said clutch basket lid, and
wherein said backing ring engages with said upper rim to prevent said backing ring from sliding off said basket housing, and
a retainer to retain said backing ring in a position that rigidly couples said basket housing to said clutch basket lid in a removable manner.

2. The clutch basket assembly as claimed in claim 1, wherein said retainer is a circlip that engages with an inner circumferential groove associated with said second set of internal backing ring teeth of said backing ring.

3. The clutch basket assembly as claimed in claim 1, wherein said basket housing is a modified OEM part from a previously welded clutch.

4. The clutch basket assembly as claimed in claim 3, wherein said OEM clutch basket housing is modified by cutting said basket housing to separate it from the clutch basket lid along a welded joint, such that a circumferential rim portion is left on said basket housing.

5. The clutch basket assembly as claimed in claim 1, wherein said clutch basket lid is not an OEM part.

6. The clutch basket assembly as claimed in claim 1, wherein said backing ring is not an OEM part.

7. A method of modifying a clutch basket assembly comprising:
taking a clutch basket assembly comprising a basket housing and a clutch basket lid, said basket housing being generally cylindrical and including a plurality of alternating basket slots and basket teeth on an outer surface extending parallel with an axis of said basket housing,
cutting said basket housing to separate it from said clutch basket lid,
providing a backing ring including a first set of internal backing ring teeth and a first set of internal backing ring slots configured to correspond and engage with said basket slots and basket teeth, to allow said backing ring to slide over said basket housing in an axial direction, and prevent relative rotation between said backing ring and said basket housing,
providing a clutch basket lid including a plurality of basket lid teeth on an outer circumference,
engaging said basket lid teeth with said backing ring that further comprises a second set of internal backing ring teeth and a second set of internal backing ring slots configured to correspond and engage with said basket lid teeth, to prevent relative rotation between said backing ring and said clutch basket lid,
engaging said backing ring with said upper rim to prevent said backing ring from sliding off said basket housing, and
retaining said backing ring in a position that rigidly couples said basket housing to said clutch basket lid in a removable manner.

8. The method of modifying a clutch basket assembly as claimed in claim 7, wherein said step of cutting said basket housing separates the basket housing from the clutch basket lid, such that a circumferential rim portion is left on said basket housing.

9. The method of modifying a clutch basket assembly as claimed in claim 7, wherein said retainer is a circlip that engages with an inner circumferential groove associated with said second set of internal backing ring teeth of said backing ring.

10. The method of modifying a clutch basket assembly as claimed in claim 7, wherein said basket housing is a modified OEM part from a previously welded clutch.

11. The method of modifying a clutch basket assembly as claimed in claim 7, wherein said clutch basket lid is not an OEM part.

12. The method of modifying a clutch basket assembly as claimed in claim 7, wherein said backing ring is not an OEM part.

13. A kit of parts for a clutch basket assembly, said kit comprising:
a generally cylindrical basket housing including a plurality of alternating basket slots and basket teeth on an outer surface extending parallel with an axis of said basket housing, said basket housing further defining an upper rim extending around a perimeter of said basket housing at one end,
a clutch basket lid including a plurality of basket lid teeth on an outer circumference,
a backing ring including a first set of internal backing ring teeth and a first set of internal backing ring slots configured to correspond and engage with said basket slots and basket teeth, to allow said backing ring to slide over said basket housing in an axial direction, and prevent relative rotation between said backing ring and said basket housing, and a second set of internal backing ring teeth and a second set of internal backing ring slots configured to correspond and engage with said basket lid teeth, to prevent relative rotation between said backing ring and said clutch basket lid,
wherein said backing ring engages with said upper rim to prevent said backing ring from sliding off said basket housing, and
a retainer to retain said backing ring in a position that rigidly couples said basket housing to said clutch basket lid in a removable manner.

14. The kit of parts as claimed in claim 13, wherein said backing ring further includes an inner circumferential groove associated with said second set of internal backing ring teeth, and said retainer is a circlip.

* * * * *